United States Patent
Nakasone

(10) Patent No.: US 9,300,187 B2
(45) Date of Patent: Mar. 29, 2016

(54) POWER GENERATION METHOD

(71) Applicant: Kazuo Nakasone, Osaka (JP)

(72) Inventor: Kazuo Nakasone, Osaka (JP)

(*) Notice: Subject to any disclaimer, the term of this patent is extended or adjusted under 35 U.S.C. 154(b) by 38 days.

(21) Appl. No.: 14/726,608

(22) Filed: Jun. 1, 2015

(65) Prior Publication Data

US 2015/0288251 A1  Oct. 8, 2015

Related U.S. Application Data

(63) Continuation of application No. PCT/JP2013/074617, filed on Sep. 12, 2013.

(51) Int. Cl.
| | |
|---|---|
| *F02B 63/04* | (2006.01) |
| *H02K 7/10* | (2006.01) |
| *H02K 7/18* | (2006.01) |
| *B65G 23/00* | (2006.01) |
| *B65G 17/12* | (2006.01) |

(52) U.S. Cl.
CPC ............ *H02K 7/1807* (2013.01); *B65G 17/126* (2013.01); *B65G 23/00* (2013.01)

(58) Field of Classification Search
CPC .... H02K 7/1807; B65G 17/126; B65G 23/00; F03B 7/003; F03B 7/006; F03B 9/00; F03B 9/005
USPC .......................................................... 290/1 D
See application file for complete search history.

(56) References Cited

U.S. PATENT DOCUMENTS

| | | | | | |
|---|---|---|---|---|---|
| 3,987,307 | A | * | 10/1976 | Giconi ................. | H02K 7/1823 198/711 |
| 2012/0013131 | A1 | * | 1/2012 | Yeh ........................... | F03G 7/10 290/1 D |
| 2014/0197642 | A1 | * | 7/2014 | Daya ...................... | H02K 53/00 290/1 D |
| 2014/0284938 | A1 | * | 9/2014 | Xu ........................... | F03G 1/00 290/1 R |

FOREIGN PATENT DOCUMENTS

| | | |
|---|---|---|
| GB | 2090939 A | 7/1982 |
| JP | H06-173842 A | 6/1994 |
| JP | H09-059964 A | 3/1997 |
| JP | H11-266553 A | 9/1999 |

(Continued)

OTHER PUBLICATIONS

International Search Report for PCT/JP2013/074617 dated Oct. 15, 2013.

(Continued)

*Primary Examiner* — Tulsidas C Patel
*Assistant Examiner* — Viet Nguyen
(74) *Attorney, Agent, or Firm* — Yokoi & Co., U.S.A.; Toshiyuki Yokoi

(57) ABSTRACT

The present invention provides a power generation method capable of storing natural energy without specific limitations and capable of taking out the natural energy as needed to generate power. The power generation method of the present invention includes a potential energy storage step and a power generation step. In the potential energy storage step, second objects are transferred from the low place to the high place by using a rotational force of a rotating body that is rotationally driven by a kinetic energy produced when a first object, which is present at a high place in nature, falls. In the power generation step, the power generator is operated by using the kinetic energy produced when the second objects fall.

9 Claims, 4 Drawing Sheets

(56) References Cited

FOREIGN PATENT DOCUMENTS

| JP | H11-294315 A | 10/1999 |
| JP | 2010-275992 A | 12/2010 |
| JP | 2011-091986 A | 5/2011 |

OTHER PUBLICATIONS

Written openion of International Preliminary Examining Authority dated May 29, 2014.
Japanese notice of the reason for refusal dated Oct. 7, 2014.
Japanese notice of the reason for refusal dated Jan. 20, 2015.

* cited by examiner

POWER GENERATION METHOD

CROSS-REFERENCES TO RELATED APPLICATIONS

This Application claims the benefit of priority and is a Continuation application of the prior International Patent Application No. PCT/JP2013/074617, with an international filing date of Sep. 12, 2013, which designated the United States, the entire disclosures of all applications are expressly incorporated by reference in their entirety herein.

BACKGROUND OF THE INVENTION

1. Field of the Invention

The present invention relates to a power generation method, especially by converting all or a part of kinetic energy of an object, which is present at a high place in nature, into potential energy and then using the potential energy to generate power in a desired time.

2. Description of Related Art

In recent years, because of the nuclear leakage accident of the nuclear power plant caused by Great East Japan Earthquake, movements to return to the power generation using natural energy have been increased.

Regarding a power generation method using natural energy, following examples were proposed in the past. For example, as shown in Japanese Patent Application Publication 2011-91986, a method by breaking down a steep mountain and generating power using potential energy of dirt when transferring the dirt to a low place was proposed. For example, as shown in Japanese Patent Application Publication 2010-275992, a method by rotating a bucket conveyor using gravity of water and buoyancy of air bubble to rotate a gear and transferring rotational force of the gear to a power generator to generate power was proposed. For example, as shown in Japanese Patent Application Publication H11-266553, a method by lifting high weight object and hold it by a hydraulic jack using natural energy such as wind power and wave power to store potential energy and converting the potential energy into kinetic energy as needed to generate power was proposed.

Patent Document 1: Japanese Patent Application Publication H11-266553

Patent Document 2: Japanese Patent Application Publication 2010-275992

Patent Document 3: Japanese Patent Application Publication 2011-91986

However, in the above described "method of breaking down a steep mountain" and "method of using gravity of water and buoyancy of air bubble", there is no concept of storing energy. On the other hand, in the above described "method of using a hydraulic jack", although energy can be stored, an amount of energy to be stored is limited by performance of the hydraulic jack.

The present invention provides a power generation method capable of storing natural energy without specific limitations and capable of taking out the natural energy as needed to generate power.

BRIEF SUMMARY OF THE INVENTION

A power generation method concerning one aspect of the present invention has a potential energy storage step and a power generation step. In the potential energy storage step, a bucket conveyor is driven by using a rotational force of a rotating body that is rotationally driven by a kinetic energy produced when a first object, which is present at a high place in nature, falls and a plurality of second objects is continuously transferred from a low place to the high place. In the power generation step, the second objects are made to fall as needed and a power generator is operated by using a kinetic energy of the second objects. Here, the bucket conveyor is connected with the power generator via an interrupter. The interrupter mechanically connects and disconnects the bucket conveyor with/from the power generator. In the potential energy storage step, the bucket conveyor is mechanically disconnected from the power generator by the interrupter, a motive power of the bucket conveyor produced by a fall of the first object is not transferred to the power generator, and the plurality of second objects is continuously transferred from the low place to the high place. On the other hand, in the power generation step, the bucket conveyor is mechanically connected with the power generator by the interrupter, and the motive power of the bucket conveyor produced by a fall of the second objects is transferred to the power generator to operate the power generator. Note that it is preferred that the second objects are transferred to the bucket conveyor by an electric forklift driven by electricity produced by the power generator.

In this power generation method, as long as the first object is present at the high place, the plurality of second objects can be transferred from the low place to the high place without specific limitations to store the natural energy of object falling, and the power generator can be operated by falling the second objects at an appropriate timing. Therefore, by using this power generation method, the natural energy can be stored without specific limitations and power can be generated by taking out the natural energy as needed.

A power generation method concerning another aspect of the present invention has a potential energy storage step and a power generation step. In the potential energy storage step, a bucket conveyor is driven by using a rotational force of a rotating body that is rotationally driven by a kinetic energy produced when a first object, which is present at a high place in nature, falls and a plurality of second objects can be continuously transferred from a low place to the high place. In the power generation step, the second objects are made to fall as needed and a power generator can be operated by using a kinetic energy of the second objects. Here, the bucket conveyor is comprised of a first bucket conveyor connected with the power generator and a second bucket conveyor connected with the first bucket conveyor via an interrupter. The interrupter mechanically connects and disconnects the first bucket conveyor with/from the second bucket conveyor. In the potential energy storage step, the first bucket conveyor is mechanically connected with second bucket conveyor by the interrupter, a motive power of the second bucket conveyor produced by a fall of the first object is transferred to the first bucket conveyor, and the plurality of second objects is continuously transferred from the low place to the high place by the first bucket conveyor. On the other hand, in the power generation step, the first bucket conveyor is mechanically disconnected from the second bucket conveyor by the interrupter, the motive power of the first bucket conveyer produced by a fall of the second objects is not transferred to the second bucket conveyor, and the power generator is operated by the first bucket conveyer. Note that it is preferred that the second objects are transferred to the first bucket conveyor by an electric forklift driven by electricity produced by the power generator. It is preferred that the first object is a dirt, a rock or a snow of a mountaintop and the second bucket conveyer is obliquely arranged along a mountain surface. It is preferred that the first object is transferred to the second bucket conveyer by an electric forklift driven by electricity produced by the power generator.

In this power generation method, as long as the first object is present at the high place, the plurality of second objects can be transferred from the low place to the high place without specific limitations to store the natural energy of object falling, and the power generator can be operated by falling the second objects at an appropriate timing. Therefore, by using this power generation method, the natural energy can be stored without specific limitations and power can be generated by taking out the natural energy as needed.

DETAILED DESCRIPTION OF THE INVENTION

<Components of Power Generation System>

Figure 1:
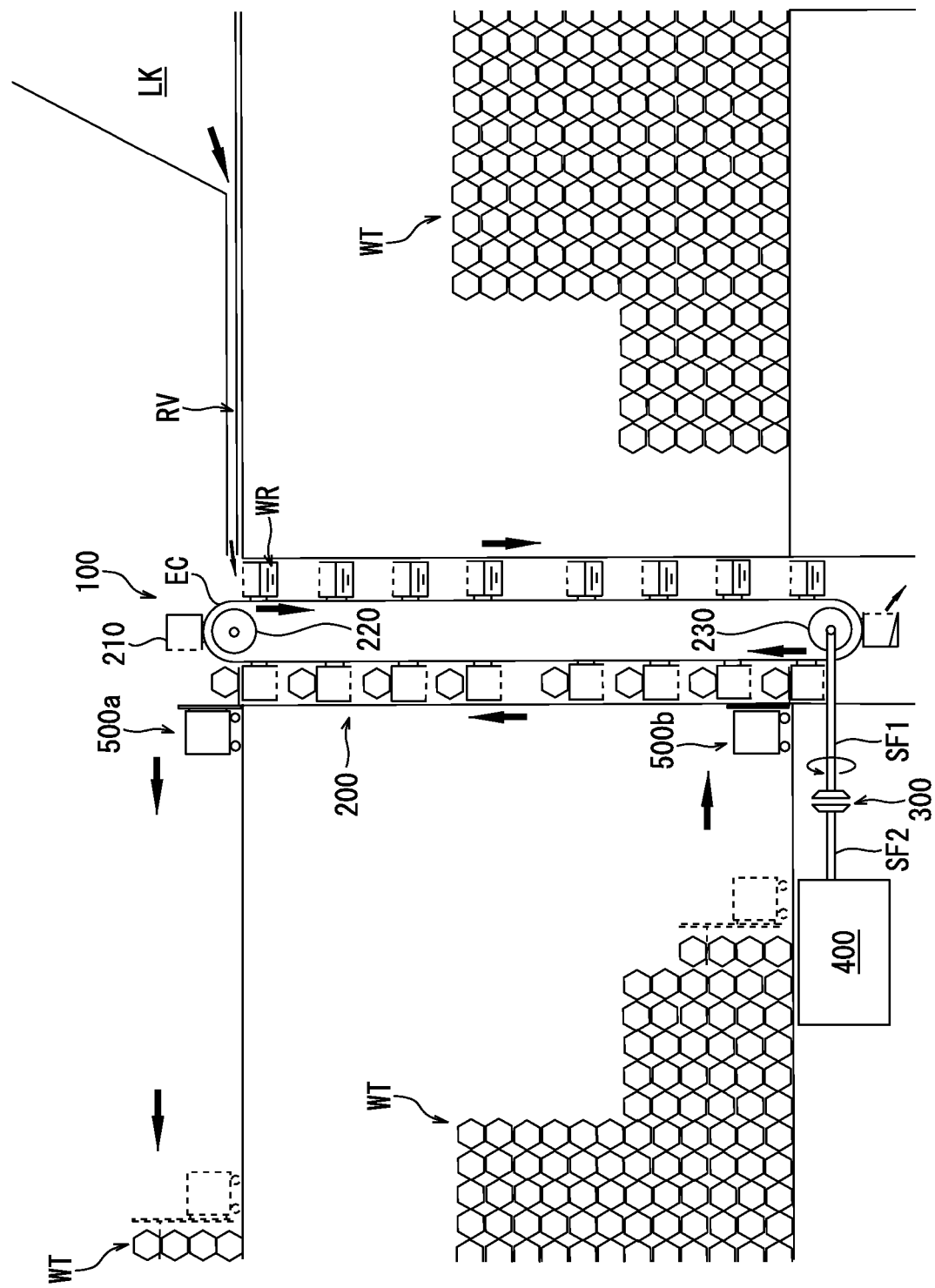
FIG. 1 is a schematic diagram showing a state that kinetic energy produced by a fall of water is converted to potential energy concerning a power generation system of an embodiment of the present invention.
Figure 2:
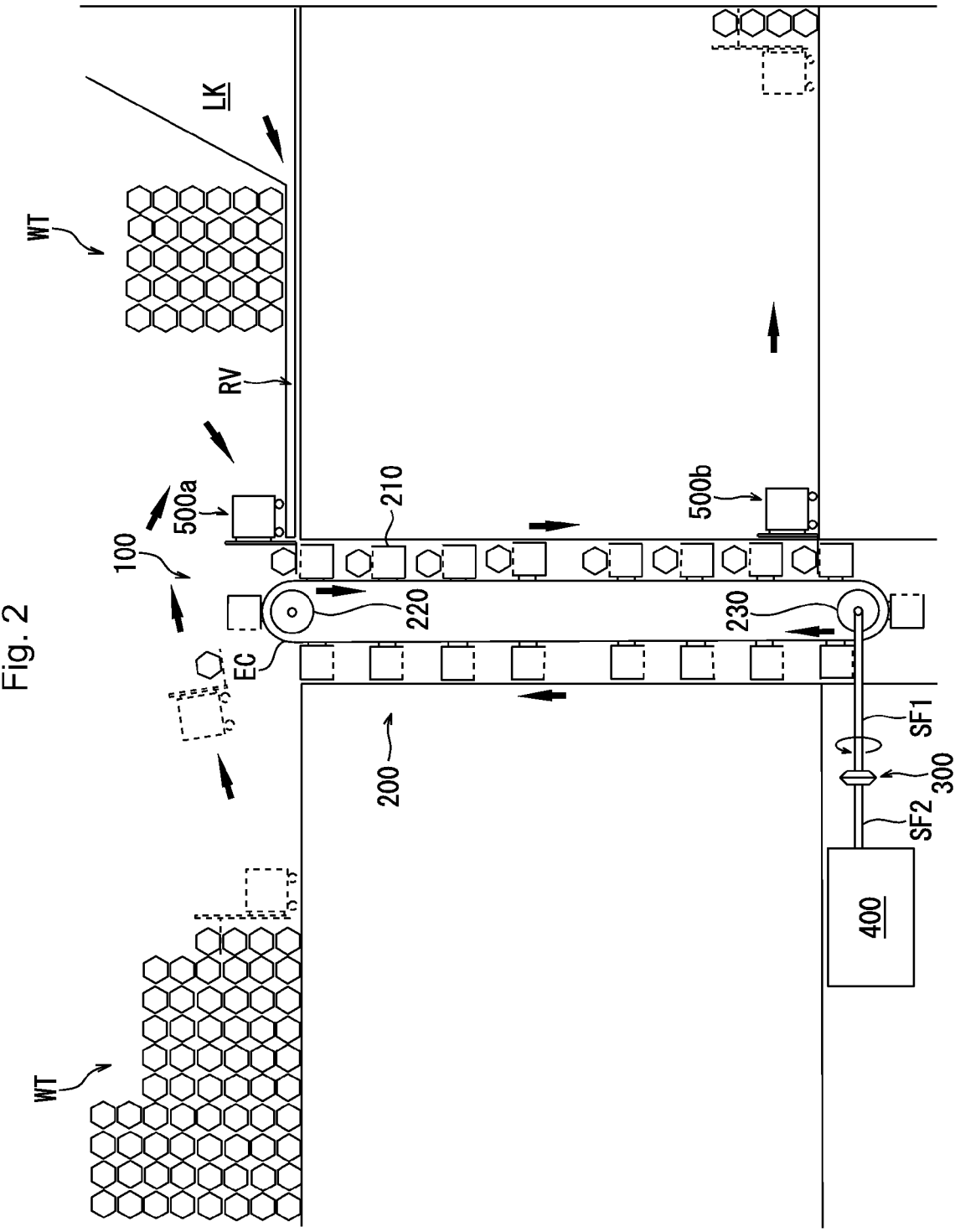
FIG. 2 is a schematic diagram showing a state that power is generated by using the stored potential energy concerning a power generation system of an embodiment of the present invention.

A power generation system 100 of an embodiment of the present invention is mainly formed by a bucket conveyor 200, an interrupter 300, a power generator 400, and electric forklifts 500a, 500b as shown in FIG. 1 and FIG. 2. Hereafter, these components will be explained in detail.

(1) Bucket Conveyor

The bucket conveyor 200 is arranged on a downstream side in a flow direction of water WR, which flows from a lake LK into a river RV. The bucket conveyor 200 is mainly formed by a bucket 210, an endless chain EC, an upper gear 220 and a lower gear 230.

Figure 4:
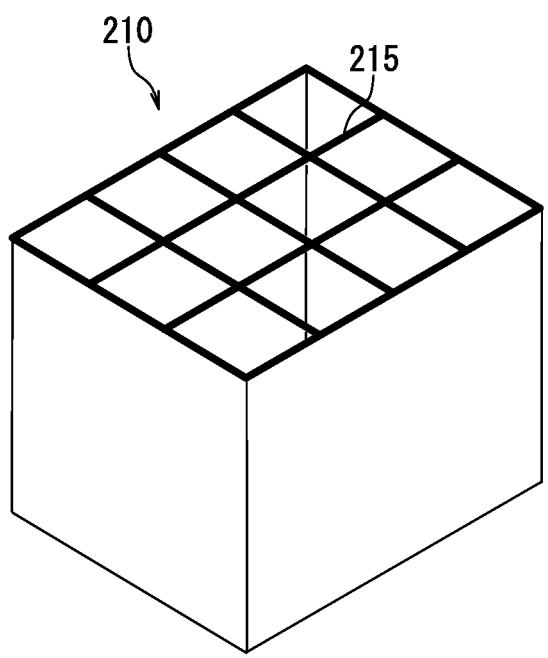
FIG. 4 is a perspective view of a bucket shown in FIG. 1 to FIG. 3.

As shown in FIG. 4, the bucket 210 is a container having an approximately cubic shape and having a grid cover 215. Namely, an upper side of the bucket 210 is open. One side wall of the bucket 210 is connected with the endless chain EC. Specifically, as shown in FIG. 1, an opening of the bucket 210 faces upward at one side and faces downward at the other side. Note that, in the present embodiment, a plurality of buckets 210 is connected with the endless chain EC as shown in FIG. 1. In addition, a grid interval of the grid cover 215 is smaller than a size of the latter mentioned weight WT so that the weight WT does not pass through the grid cover 215.

The endless chain EC is formed between the upper gear 220 and the lower gear 230.

The upper gear 220 and the lower gear 230 are engaged with the endless chain EC respectively at an upper side and a lower side. Note that both the upper gear 220 and the lower gear 230 are not connected with a driving source. In addition, the lower gear 230 is connected with a bucket conveyor-side shaft SF1 via a not illustrated worm gear. Therefore, when the lower gear 230 is rotated, the bucket conveyor-side shaft SF1 is rotated around its axis.

Note that the bucket conveyor-side shaft SF1 can be connected with the upper gear 220 without limited to the lower gear 230. In such a case, the later mentioned interrupter 300 and power generator 400 should be arranged on a side of a high place.

As explained above, the bucket conveyor includes: the endless chain EC that is formed between the upper gear 220 arranged at a high place and the lower gear 230 arranged at a low place and engaged with the upper gear 220 and the lower gear 230; the bucket 210 that is a container having an opening at an upper side; and the bucket conveyor-side shaft SF1 that is connected to either the upper gear 220 or the lower gear 230 via a gear to be rotated around an axis of the bucket conveyor-side shaft SF1 when the lower gear 230 is rotated. In addition, the grid cover 215 is attached to the opening, a grid interval of the grid cover 215 is smaller than a size of the weight WT, one side wall of the bucket 210 is connected with the endless chain EC, and the opening faces upward at one side of the endless chain EC and the opening faces downward at the other side between the upper gear 220 and the lower gear 230.

(2) Interrupter

As shown in FIG. 1 and FIG. 2, the interrupter 300 mechanically connects and disconnects the bucket conveyor-side shaft SF1 with/from a power generator-side shaft SF2.

(3) Power Generator

The power generator 400 is a general power generator. In the present embodiment, the generator is not particularly limited.

(4) Electric Forklift

The electric forklifts 500a, 500b are respectively arranged at an upstream side and a downstream side of the bucket conveyor 200. Note that, in the embodiment, the electric forklifts 500a, 500b are driven by a large-size secondary battery that is charged with electric energy produced by the power generator 400.

<Operating Method of Power Generation System>

The power generation system 100 of the present embodiment can take two states, i.e., a potential energy storage state and a power generation state. Hereafter, operations of the power generation system 100 in each state will be explained in detail.

(1) Potential Energy Storage State

In the potential energy storage state, as shown in FIG. 1, the interrupter 300 mechanically disconnects the connection between the bucket conveyor-side shaft SF1 and the power generator-side shaft SF2. In this state, if the water WR flows from the river RV into the bucket 210, the bucket 210 is pushed down by a fall of the water WR, then the endless chain EC starts to rotate and the upper gear 220 and the lower gear 230 are rotated accordingly. When the next bucket 210 is moved to a fall position of the water WR, the water WR flows into the next bucket 210 to rotate the endless chain EC in the same way. The above described state is repeated and the endless chain EC, the upper gear 220 and the lower gear 230 are continuously rotated. Note that the water WR flowing into the bucket 210 is discharged downward at a position immediately below the lower gear 230 because the opening of the bucket 210 faces sideways. In addition, as shown in FIG. 1, when the bucket 210 is moved from the lower side to the upper side, the opening of the bucket 210 faces downward, i.e., a bottom wall of the bucket 210 faces upward.

While the endless chain EC is rotated as described above, the weight WT is placed on an opposite side of the bottom wall of the bucket 210 by the electric forklift 500b of the downstream side in a direction of falling water, the weight WT is removed from the bucket 210 by the electric forklift 500a of the upstream side in the direction of falling water, and the weight WT is stored at the high place. Thus, energy of water falling is stored as the potential energy.

In the potential energy storage step, the bucket conveyor is mechanically disconnected from the power generator by mechanically disconnecting the bucket conveyor-side shaft SF1 from the power generator-side shaft SF2 by using the interrupter 300. Thus, the motive power of the bucket conveyor produced when the bucket conveyor-side shaft SF1 is rotated by the fall of the water WR, which is the first object, is not transferred to the power generator. In addition, the weight WT, which is the plurality of second objects, is continuously transferred from the low place, which is the downstream side in the direction of falling water, to the high place, which is the high place.

In the potential energy storage step, the bucket 210 is opened upward at one side of the endless chain EC of the bucket conveyor. In this state, if the water WT, which is the first object, is entered in the bucket 210 from above at the high place, which is the upstream side in the direction of falling water, the water WT is stored in the bucket 210, a weight of the water WT functions to push down the bucket 210, the endless chain EC is pushed down, and whole the endless chain EC is rotated in one direction.

When the bucket 210 storing the water WT reaches the lowest point of the downstream side in the direction of falling water, the bucket 210 is rotated together with the endless chain EC along the lower gear 230. Therefore, the water WT in the bucket 210 is automatically discharged. The bucket 210 starts to move from lower to upper at the other side of the endless chain EC in accordance with the movement of the endless chain EC.

At that time, the opening of the bucket 210 faces downward. Therefore, the weight WT can be placed on an opposite side of a bottom of the bucket 210. By placing the weight WT on the opposite side, the weight WT is transferred from the downstream side in the direction of falling water to the upstream side in the direction of falling water.

(2) Power Generation State

In the power generation state, as shown in FIG. 2, the interrupter 300 mechanically connects the bucket conveyor-side shaft SF1 with the power generator-side shaft SF2. In this state, if the weight WT is placed on the grid cover 215 of the bucket 210 by the electric forklift 500a of the upstream side in the direction of falling water, the bucket 210 is pushed down by a fall of the weight WT, the endless chain EC starts to rotate, and the upper gear 220 and the lower gear 230 are rotated accordingly. When the next bucket 210 reaches a loading position of the weight WT, another weight WT is placed on the grid cover 215 of the next bucket 210 by the electric forklift 500a again and the endless chain EC is rotated. The above described state is repeated to rotate the endless chain EC, the upper gear 220 and the lower gear 230 continuously. Thus, the rotational force of the lower gear 230 is transferred to the power generator 400 via the bucket conveyor-side shaft SF1, the interrupter 300 and the power generator-side shaft SF2, and power is generated. Note that the weight WT placed on the grid cover 215 of the bucket 210 is removed from the bucket 210 at a position near the lower gear by the electric forklift 500b of the downstream side in the direction of falling water, and the weight WT is stored at the low place.

In the power generation step, the bucket conveyor is mechanically connected with the power generator by mechanically connecting the bucket conveyor-side shaft SF1 with the power generator-side shaft SF2 by using the interrupter 300. In this state, if the weight WT, which is the second objects, is placed on the grid cover 215 of the bucket 210, the bucket 210 is pushed down by a fall of the weight WT, the endless chain EC starts to rotate, and the upper gear 220 and the lower gear 230 are rotated accordingly. The motive power of the bucket conveyor produced by a fall of the weight WT is converted to the rotational force of the lower gear 230, and the rotational force is transferred to the power generator 400 via the bucket conveyor-side shaft SF1, the interrupter 300 and the power generator-side shaft SF2 to operate the power generator 400.

In the power generation step, although the bucket 210 is opened upward at one side of the endless chain EC of the bucket conveyor, the weight WT can be placed on the grid cover 215 because the grid cover 215 is attached. In this state, a weight of the weight WT, which is the second objects, functions to push down the bucket 210 from above at the high place, which is the upstream side in the direction of falling water, the endless chain EC is pushed down, and whole the endless chain EC is rotated in one direction.

When the bucket 210 storing the weight WT is moved to a loading position located before the lowest point of the downstream side in the direction of falling water, the weight WT is removed from the bucket 210 and stored at the low place. A process of placing the weight WT on the bucket 210 at the high place and removing and storing the weight WT at the low place is continuously repeated.

<Feature of Power Generation System of Embodiment>

(1)

In the power generation system 100 of the present embodiment, the energy of water falling of the water WR can be stored as the potential energy by using a fall of the water WR flowing in the river RV, and the power generator 400 can be operated by falling the weight WT at an appropriate timing Therefore, by using the power generation system 100, the potential energy can be stored without specific limitations and the potential energy can be taken out as needed to generate power.

TABLE 1

| total inflow amount ($m^3$/s) | total water discharge amount ($m^3$/s) | water storage amount ($km^3$) | water storage ratio (%) | water storage ratio (%) |
|---|---|---|---|---|
| 78.40 | 82.85 | 6410 | 62.10 (service water capacity) | 32.10 (effective capacity) |

Meanwhile, Table 1 shows the water discharge amount discharged from Amagase Dam from 19:00 to 19:01 on Jun. 21, 2011 (total water discharge amount, information distributed on the internet of Ministry of Land, Infrastructure, Transport and Tourism). Before the rainy season in Japan, unless water is discharged from Amagase Dam, there is a risk of burst of the dam and collapse of the house caused by flood and landslide, for example. From Table 1, the water discharge amount per 1 second of the above described period is 82.8 tons. The water discharge amount per 1 month calculated from the above data is 214,617,600 tons (82.8 tons×60 seconds×60 minutes×24 hours×30 days). It is a waste to leave such a large amount of water continuously flow. Therefore, such a large amount of water can be used efficiently by using the power generation method of the present invention. Although anti-nuclear power plant is acknowledged as a problem today, the inventor of the present invention considers that the problem can be solved by efficiently using that. In general, it is said that it is technologically impossible to store electricity (alternate current) used in a home currently on the earth. However, the impossibility is turned to possibility by using the power generation method of the present invention. In other words, by using the power generation method of the present invention, the potential energy can be permanently and unlimitedly stored and power can be generated immediately at any time. Here, "permanently and unlimitedly" means that rain is made to fall by energy radiated from the sun and the potential energy of the water trapped at the high place by the rain can be converted into the potential energy of the weight WT and stored.

(2)

In the power generation system 100 of the embodiment, the electric forklifts 500a, 500b are driven by the large-size secondary battery that is charged with electric energy produced by the power generator 400. Therefore, power can be generated by using only natural energy.

<Variation Examples>

(A)

In the power generation system 100 of the previous embodiment, the interrupter is in a disconnected state in the potential energy storage state. However, the interrupter can be continuously or intermittently connected. Thus, a part of the energy of falling water of the water WR can be used for the power generation and the other part of the energy can be used for storing the potential energy. As a result, power can be always generated any time day or night.

(B)

In the power generation system 100 of the previous embodiment, the potential energy is stored and power is generated by using the water flowing in the river RV. However, a dirt, a rock or a snow of a mountaintop can be used instead of the water WR. In such a case, it is preferred that the bucket conveyor 200 is obliquely arranged along a mountain surface. Thus, in addition to the above described effects, land formation can be performed.

(C)

In the power generation system 100 of the previous embodiment, height difference of the river RV is used. However, height difference of the dam can be used instead.

(D)

In the power generation system 100 of the previous embodiment, the electric forklifts 500a, 500b are used for transferring the weight WT. However, a forklift equipping a gasoline engine can be used instead.

(E)

Figure 3:
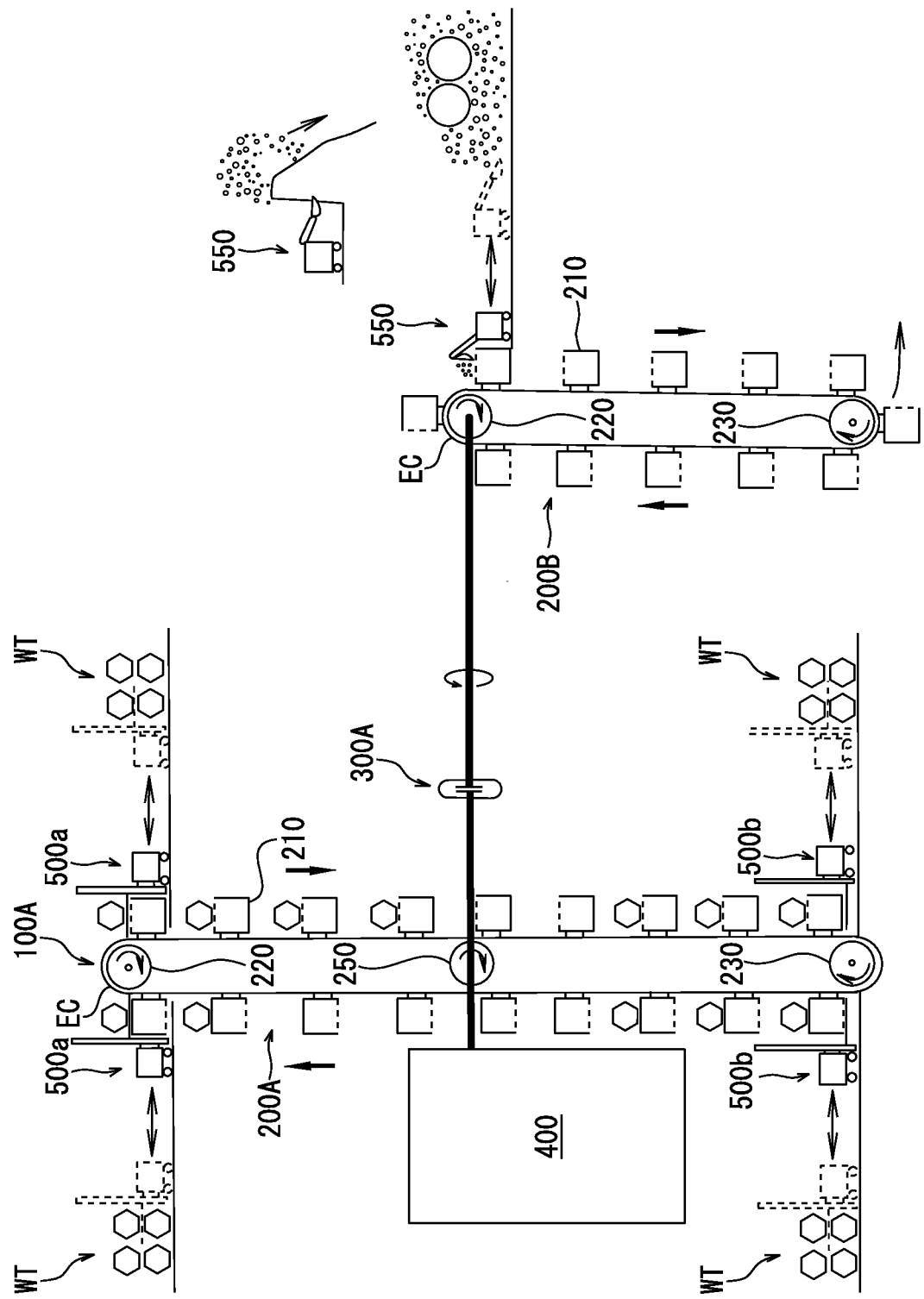
FIG. 3 is a schematic diagram showing a power generation system concerning a variation example (E).

Although not mentioned in the previous embodiment, a power generation system 100A shown in FIG. 3 can be used as a power generation system. The power generation system 100A is basically same as the power generation system 100 of the previous embodiment except for the following points: (i) a dirt and a snow is used instead of the water WR; (ii) a bucket conveyor 200B used only for the dirt or the snow and a bucket conveyor 200A used for transferring the weight and generating power are provided together; (iii) an intermediate gear 250 engaged with the endless chain EC is provided between the lower gear 230 and the upper gear 220 of the bucket conveyor 200A used for transferring the weight and generating power; (iv) an interrupter 300A is provided between the bucket conveyor 200B used only for the dirt or the snow and the bucket conveyor 200A used for transferring the weight and generating power; (v) the power generator 400 is connected to the intermediate gear 250; and (vi) an electric shovel car 550 is used for scraping out the dirt or the snow. Regarding the components same as the power generation system 100 of the previous embodiment, the same reference numerals are applied and explanations are omitted.

The bucket conveyor 200B used only for the dirt or the snow is mainly formed by the buckets 210, the endless chain EC, the upper gear 220 and the lower gear 230, as shown in FIG. 3. The bucket conveyor 200B is basically same as the bucket conveyor 200 of the previous embodiment.

The interrupter 300A is in a connected state in the potential energy storage state, and in a disconnected state in the power generation state. Same as the power generation system 100 of the previous embodiment, another interrupter can be arranged between the power generator 400 and the intermediate gear 250.

Same as the electric forklifts 500a, 500b, the electric shovel car 550 is driven by a large-size secondary battery that is charged with electric energy produced by the power generator 400. Note that a shovel car equipping a gasoline engine can be used instead of the electric shovel car 550.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

While the invention has been particularly shown and described with respect to preferred embodiments thereof, it should be understood by those skilled in the art that the foregoing and other changes in form and detail may be made therein without departing from the sprit and scope of the invention as defined in the appended claims.

What is claimed is:

1. A power generation method comprising:
  a potential energy storage step of driving a bucket conveyor by using a rotational force of a rotating body that is rotationally driven by a kinetic energy produced when a first object, which is present at a high place in nature, falls and continuously transferring a plurality of second objects from a low place to the high place; and
  a power generation step of operating a power generator by using a kinetic energy of the second objects at an appropriate timing, the kinetic energy being generated by falling the second objects, wherein
  the bucket conveyor is connected with the power generator via an interrupter,
  the interrupter mechanically connects and disconnects the bucket conveyor with/from the power generator,
  in the potential energy storage step, the bucket conveyor is mechanically disconnected from the power generator by the interrupter, a motive power of the bucket conveyor produced by falling the first object is not transferred to the power generator, and the plurality of second objects is continuously transferred from the low place to the high place by the bucket conveyor, and
  in the power generation step, the bucket conveyor is mechanically connected with the power generator by the interrupter, and the motive power of the bucket conveyer produced by falling the second objects is transferred to the power generator to operate the power generator.

2. The power generation method according to claim 1, wherein
in the power generation step, the second objects are transferred to the bucket conveyor by an electric forklift driven by an electricity produced by the power generator.

3. The power generation method according to claim 1, wherein
the bucket conveyor is comprised of:
an endless chain that is formed between an upper gear located at the high place and a lower gear located at the low place and engaged with the upper gear and the lower gear;
a bucket that is a container having an opening at an upper side; and
a bucket conveyor-side shaft that is connected to either of the upper gear or the lower gear via a gear to be rotated around an axis of the bucket conveyor-side shaft when the lower gear is rotated,
a grid cover is attached to the opening,
a grid interval of the grid cover is smaller than a size of the second objects, one side wall of the bucket is connected with the endless chain, and
the opening faces upward at one side of the endless chain and the opening faces downward at the other side between the upper gear and the lower gear.

4. The power generation method according to claim 1, wherein
in the potential energy storage step,
the bucket is opened upward at one side of the endless chain in the bucket conveyor,
the first object is entered in the bucket from above at the high place, a weight of the first object functions to push down the bucket, the endless chain is pushed down, and whole the endless chain is rotated in one direction,
when the bucket storing the first object reaches a lowest point of the low place, the bucket is rotated together with the endless chain along the lower gear, the first object in the bucket is automatically discharged, and the bucket starts to move from lower to upper at the other side of the endless chain in accordance with a movement of the endless chain, and
an opening of the bucket faces downward so that a weight can be placed on an opposite side of a bottom of the bucket, and the weight is transferred from a downstream side in a direction of falling water to an upstream side by placing the weight on the opposite side.

5. The power generation method according to claim 1, wherein
in the power generation step,
a weight can be placed on a grid cover of a bucket opened upward at one side of the endless chain in the bucket conveyor,
the second objects are placed on the grid cover of the bucket at the high place, a weight of the second objects functions to push down the bucket, the endless chain is pushed down, and whole the endless chain is rotated in one direction,
when the bucket storing the second objects is transferred to a loading position located before a lowest point of the low place, the second objects are removed from the bucket and stored at the low place, and
a process of placing the second objects on the bucket at the high place and removing and storing the second objects at the low place is continuously repeated.

6. A power generation method comprising:
a potential energy storage step of driving a bucket conveyor by using a rotational force of a rotating body that is rotationally driven by a kinetic energy produced when a first object, which is present at a high place in nature, falls and continuously transferring a plurality of second objects from a low place to the high place; and
a power generation step of operating a power generator by using a kinetic energy of the second objects at an appropriate timing, the kinetic energy being generated by falling the second objects, wherein
the bucket conveyor is comprised of a first bucket conveyor connected with the power generator and a second bucket conveyor connected with the first bucket conveyor via an interrupter,
the interrupter mechanically connects and disconnects the first bucket conveyor with/from the second bucket conveyor,
the potential energy storage step, the first bucket conveyor is mechanically connected with the second bucket conveyor by the interrupter, a motive power of the second bucket conveyor produced by falling the first object is transferred to the first bucket conveyor, and the plurality of second objects is continuously transferred from the low place to the high place by the first bucket conveyor, and
in the power generation step, the first bucket conveyor is mechanically disconnected from the second bucket conveyor by the interrupter, the motive power of the first bucket conveyer produced by falling the second objects is not transferred to the second bucket conveyor, and the power generator is operated by the first bucket conveyer.

7. The power generation method according to claim 6, wherein
in the power generation step, the second objects are transferred to the first bucket conveyor by an electric forklift driven by an electricity produced by the power generator.

8. The power generation method according to claim 6, wherein
the first object is a dirt, a rock or a snow of a mountaintop, and
the second bucket conveyer is obliquely arranged along a mountain surface.

9. The power generation method according to claim 8, wherein
in the potential energy storage step, the first object is transferred to the second bucket conveyer by an electric forklift driven by electricity produced by the power generator.

* * * * *